_United States Patent Office_

3,449,015
Patented June 10, 1969

3,449,015
ELECTRONIC CONTROLLED PNEUMATIC CONVEYOR
Alfred John Payne, High Wycombe, England, assignor to Detexomat Limited, High Wycombe, Buckinghamshire, England, a British company
Filed Jan. 19, 1968, Ser. No. 699,110
Claims priority, application Great Britain, Jan. 26, 1967, 4,016/67
Int. Cl. B65g *53/04;* H01k *47/14*
U.S. Cl. 302—27                     5 Claims

ABSTRACT OF THE DISCLOSURE

A pneumatic conveyor particularly for conveying stockings or other hose from circular knitting machines to collection points around the hosiery mill. The conveyor comprises a collector conduit with branch conduits leading into it. Each branch conduit has a separate pneumatic control valve controlled by a separate electrical control arrangement including a semiconductor gate controlled device or a thermionic grid controlled device. The controlled devices are arranged in a control circuit so that the pneumatic control valves are actuated sequentially for sequential collection of articles from the branch conduits to be delivered at the collection point.

---

The invention relates to pneumatic conveyors, particularly though not exclusively to such pneumatic conveyors of garments, for example stockings or other hose, from circular knitting machines or other appropriate collection points around a hosiery mill.

A pneumatic conveyor embodying the invention comprises a collector conduit, leading to a collection point and having a plurality of branch conduits connected thereto, each branch conduit having a separate pneumatic control means associated therewith, each pneumatic control means being operable by a separate electronic control means associated therewith including an electronic controlled device and all the electronic controlled devices being so arranged in a control circuit that the pneumatic control means can be actuated sequentially to facilitate sequential collection of articles from the branch conduits to be delivered at the collection point.

The pneumatic control means each comprise a valve for selectively opening and closing its associated branch conduit and the electronic control means each comprise the coil of an electromagnet for actuating the valve, which coil is connected across electrical supply terminals in series with the electronic controlled device.

Figure 1:
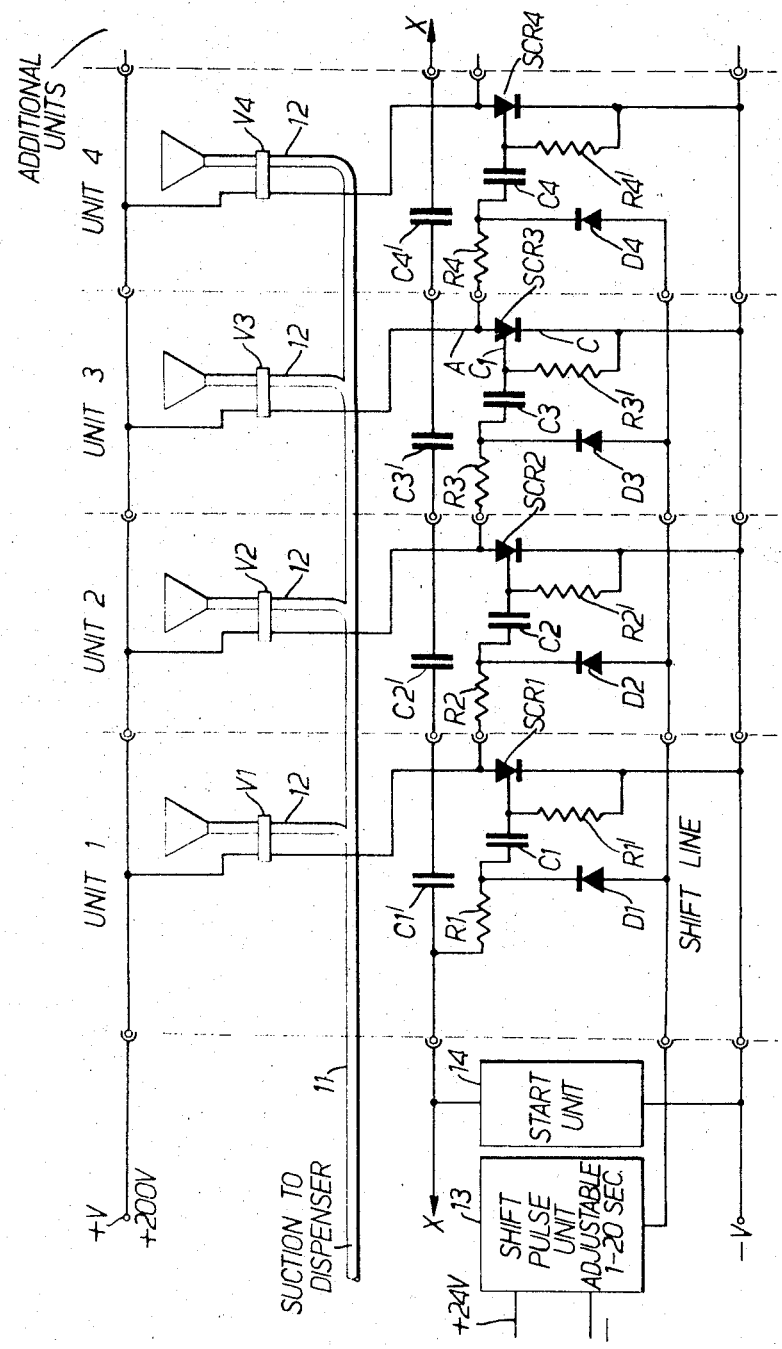
Figure 2:
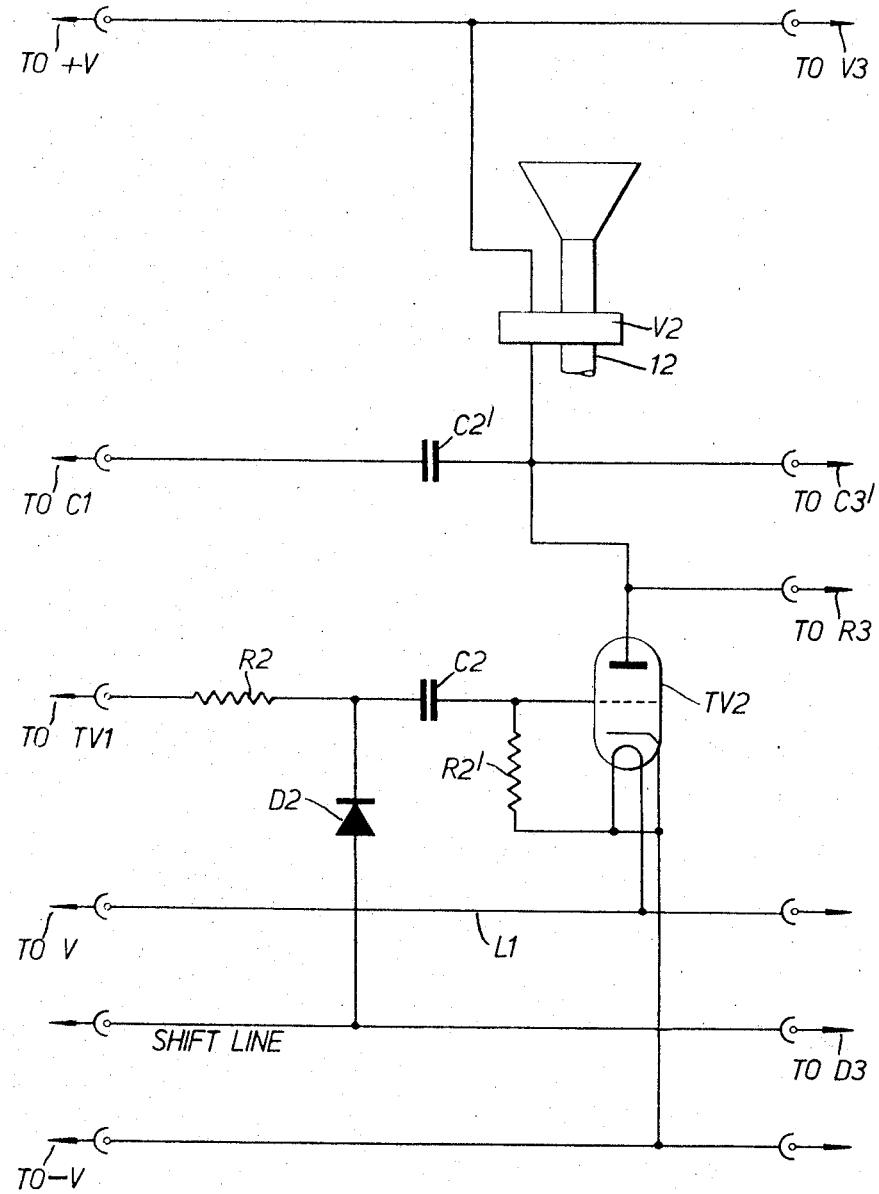

The foregoing and further features of the invention may be more readily understood from the following description of a preferred embodiment thereof, by way of example, with reference to the accompanying drawings, in which:

FIG. 1 shows schematically a pneumatic conveyor for collecting hosiery from circular knitting machines and includes a circuit diagram of the control system, and FIG. 2 is a similar showing of one stage of a modified system similar to that of FIG. 1.

Referring now to FIG. 1 there is shown a pneumatic conveyor or collector for collecting hosiery from circular knitting machines. The conveyor comprises a main or collector conduit 11 through which hosiery is pneumatically passed under the action of suction applied to a dispenser or collection point (not shown). A separate branch conduit 12 is connected to the main conduit 11 at each of four collecting units 1 to 4 respectively. Each of the branch conduits 12 is formed at its end remote from the main conduit 11 with a funnel-shaped opening into which the hosiery is dropped from the circular knitting machines.

Each of the branch conduits 12 of the collection units 1 to 4 has an electromagnetically operated valve V1 to V4 arranged to selectively open or close the associated branch conduit. The operating coil of each of the valves V1 to V4 is connected on one side to an electrical supply terminal +V and on the other side to the anode of a silicon controlled rectifier SCR1 to SCR4 respectively. Each of the cathodes of the silicon controlled rectifiers SCR1 to SCR4 is connected to a further electrical supply terminal —V. Considering now the control circuit of unit 4 in detail the gate electrode of silicon controlled rectifier SCR4 is connected via a capacitor C4 and a resistor R4 to the anode of silicon controlled rectifier SCR3 of unit 3. In addition the gate electrode of silicon controlled rectifier SCR4 is connected via a resistor R4' to its cathode. The junction between the resistor R4 and the capacitor C4 is connected via a diode D4 to the output of a pulse generator 13. A commutating capacitor C4' is connected between the anodes of silicon controlled rectifiers SCR3 and SCR4.

The control circuits for each of the other units 1 to 3 are identical to that above described for unit 4 except that the resistor R1 of unit 1 is connected to the plate of capacitor C1' remote from the connection to anode of silicon controlled rectifier SCR1 and is connected to one side of a start unit 14, the other side of which is connected to terminal —V. The points referenced X on the leads connected to capacitors C1' and C4' are connected together. The start unit 14 may comprise a silicon controlled rectifier connected between its two sides.

In operation with a DC supply voltage connected between the terminals +V and —V the silicon controlled rectifier in start unit 14 is caused to conduct and hence a circuit is provided from terminal +V, through operating coil of valve V4 through start unit 14 to terminal —V. Valve V4 opens and allows an article contained in the branch conduit 12 to move into main conduit 11 and pass to the dispenser. At this time the diodes D2, D3 and D4 are reverse biased by the supply from terminal +V via the valve operating coil of the next preceding unit and their associated resistors R2, R3 and R4 respectively. However, diode D1 is reverse biased by a relatively low voltage as determined by the respective anode voltages of the silicon controlled rectifiers. A pulse is then delivered from the output of the pulse generator 13 which passes through diode D1 and capactior C1 to the gate electrode of silicon controlled rectifier SCR1 causing it to conduct and allowing valve V1 to be operated. Diodes D2, D3 and D4 block this pulse from the pulse generator 13 and prevent it from passing to the gate electrodes of their associated silicon controlled rectifiers SCR2, SCR3 and SCR4. The output pulses from the pulse generator 13 are arranged to be of a higher voltage than the anode voltages of the silicon controlled rectifiers but less than the voltage by which diodes D2, D3 and D4 are reverse biased.

At this position in the sequence diodes D1, D3 and D4 are reverse biased by the supply from terminal +V whilst diode D2 is reverse biased merely by said lower voltage. Hence, when the next output pulse is emitted from pulse generator 13 it passes only through diod D2 and capacitor C2 to the gate electrode of silicon controlled rectifier SCR2 so causing this silicon controlled rectifier to conduct and allowing valve V2 to be opened. At the time silicon controlled rectifier SCR2 conducts the commutating capacitor C2' supplies a reverse voltage pulse across the anode and cathode of silicon controlled rectifier SCR1 so causing it to turn off, hence closing valve V1.

The operation of the whole circuit arrangement continues in identical manner so that the valves V1 to V4 are sequentially and cyclically controlled. The repetition frequency of pulse generator 13 may be made adjustable so that the complete sequence of actuation of all the valves V1 to V4 is synchronied with the time taken to knit a stocking.

The resistors R1 to R4 are of relatively high resistance to control and reverse biasing of their respective diodes D1 to D4. The capacitors C1 to C4 act as blocking capacitors to ensure that only the pulses from the pulse generator 13 pass to the gate electrodes of their associated silicon controlled rectifiers to prevent spurious actuation thereof. The resistors R1' to R4' are provided to control the sensitivity of the arrangement.

The electrical circuit of each of the units may be connected to plug and socket connectors so that additional units can be added at will by merely plugging in such additional units. It is then merely necessary to adjust the repetition frequency of the pulse generator 13 so that the complete sequence of actuation of all the valves is synchronised with the time taken to knit a stocking.

It will be apparent to those skilled in the art that the components of the control circuit shown in FIG. 1 could be changed and/or rearranged, for example the silicon controlled rectifiers could be replaced by other similar devices such as gate turn-off switches.

Referring now to FIG. 2 there is shown schematically an arrangement corresponding to unit 2 of FIG. 1 except that the semi-conductor controlled rectifier SCR2 has been replaced by a thermionic grid controlled device TV2, which could for example, be a thyratron. The connection from electromagnetic valve V2 is connected to the anode of the thermionic grid controlled device TV2 and the cathode thereof is connected to the line leading to terminal —V and to the side of resistor R2' remote from that connected to capacitor C2. The junction between capacitor C2 and resistor R2' is connected to the grid electrode of thermionic grid controlled device TV2.

An additional lead L1 is provided leading to a terminal V to which a supply is connected to energize the heaters of the thermionic grid controlled devices. One side of the heater of device TV2 is connected to the lead L1 and the other side of the heater is connected to the junction between the resistor R2' and the cathode of device TV2. It will be apparent from the arrangement of the single unit shown in FIG. 2 that a complete pneumatic conveyor system and control can be provided as shown in FIG. 1, the shift pulse unit 13 and start unit 14 also being provided with a conveyor utilising arrangement as shown in FIG. 2. The operation of such a conveyor is identical to that described for the operation of the arrangement of FIG. 1 and therefore is not further described.

It will be seen that the arrangements shown provide successive operation to valves in such a manner that the conveyor can be extended to serve additional machines in a simple manner with the minimum of additional wiring, or no such wiring at all, and in an economical fashion.

I claim:
1. A pneumatic conveyor comprising:
a collector conduit, said collector conduit leading to a collection point;
a plurality of branch conduits, said branch conduits connected to said collector conduit at spaced points therealong;
a plurality of pneumatic control means, a separate one of said pneumatic control means being provided in each branch conduit, each pneumatic control means comprising a valve for selectively opening and closing its associated branch conduit; and
a plurality of electronic control means, a separate one of said electronic control means being associated with each of said pneumatic control means, each electronic control means including electrical supply terminals, an electromagnet coil for actuating the valve of its associated pneumatic control means, and an electronic controlled device coupled in series with said coil, the series combination being coupled across said supply terminals, the electronic controlled devices being so arranged in a control circuit that the pneumatic control means can be actuated sequentially to facilitate sequential collection of articles from the branch conduits in turn to be delivered at the collection point, each electronic controlled device comprising:
a semiconductor gate controlled device;
a source of pulses;
a diode coupling the gate electrode of said semiconductor device to said source of pulses, each diode also being connected to the junction of the electromagnet coil and the semiconductor gate controlled device of the preceding stage such that all the diodes except the one connected to a conducting semiconductor gate controlled device are reverse biased by the electrical supply supplied to the electrical supply terminals.

2. A pneumatic conveyor as claimed in claim 1 wherein a separate commutating capacitor is connected between each said junction and the similar said junction of each succeeding stage whereby the semiconductor gate controlled device of each stage is caused to assume its nonconducting state when the semiconductor gate controlled device of the next succeeding stage is caused to conduct.

3. A pneumatic conveyor as claimed in claim 2 wherein the semiconductor gate controlled devices each comprise a silicon controlled rectifier.

4. A pneumatic conveyor comprising:
a collector conduit, said collector conduit leading to a collection point;
a plurality of branch conduits, said branch conduits connected to said collector conduit at spaced points therealong;
a plurality of pneumatic control means, a separate one of said pneumatic control means being provided in each branch conduit, each pneumatic control means comprising a valve for selectively opening and closing its associated branch conduit; and
a plurality of electronic control means, a separate one of said electronic control means being associated with each of said pneumatic control means, each electronic control means including electrical supply terminals, an electromagnet coil for actuating the valve of its associated pneumatic control means and an electronic controlled device coupled in series with said coil, said series combination being coupled across said supply terminals, the electronic controlled devices being so arranged in a control circuit that the pneumatic control means can be actuated sequentially to facilitate sequential collection of articles from the branch conduits in turn to be delivered at the collection point, each electronic controlled device comprising:
a thermionic grid controlled device;
a source of pulses;
a diode coupling the grid electrode of said thermionic device to said source of pulses, each diode also being connected to the junction of the electromagnet coil and the thermionic grid controlled device of the preceding stage such that all the diodes except the one connected to a conducting thermionic grid controlled device are reverse biased by the electrical supply supplied to the electrical supply terminals.

5. A pneumatic conveyor as claimed in claim 4 wherein a separate commutating capacitor is connected between each said junction and the similar said junction of each succeeding stage whereby the thermionic grid controlled device of each stage is caused to assume its non-conducting state when the thermionic grid controlled device of the next succeeding stage is caused to conduct.

References Cited

UNITED STATES PATENTS

| | | | |
|---|---|---|---|
| 3,099,962 | 8/1963 | Smith | 317—139 |
| 3,157,439 | 11/1964 | Salmona | 302—27 |
| 3,207,559 | 9/1965 | Poteat et al. | 302—27 |
| 3,215,916 | 11/1965 | Hermann | 317—139 |

ANDRES H. NIELSEN, *Primary Examiner.*

U.S. Cl. X.R.

317—139